3,514,394
CYCLIC PROCESS FOR CONVERTING COAL INTO LIQUID PRODUCTS BY USE OF FIXED CATALYTIC BEDS
Edward L. Wilson, Jr., and Edward F. Wadley, Baytown, Tex., assignors to Esso Research and Engineering Company
Filed Feb. 28, 1968, Ser. No. 709,065
Int. Cl. C10g 1/06
U.S. Cl. 208—10      10 Claims

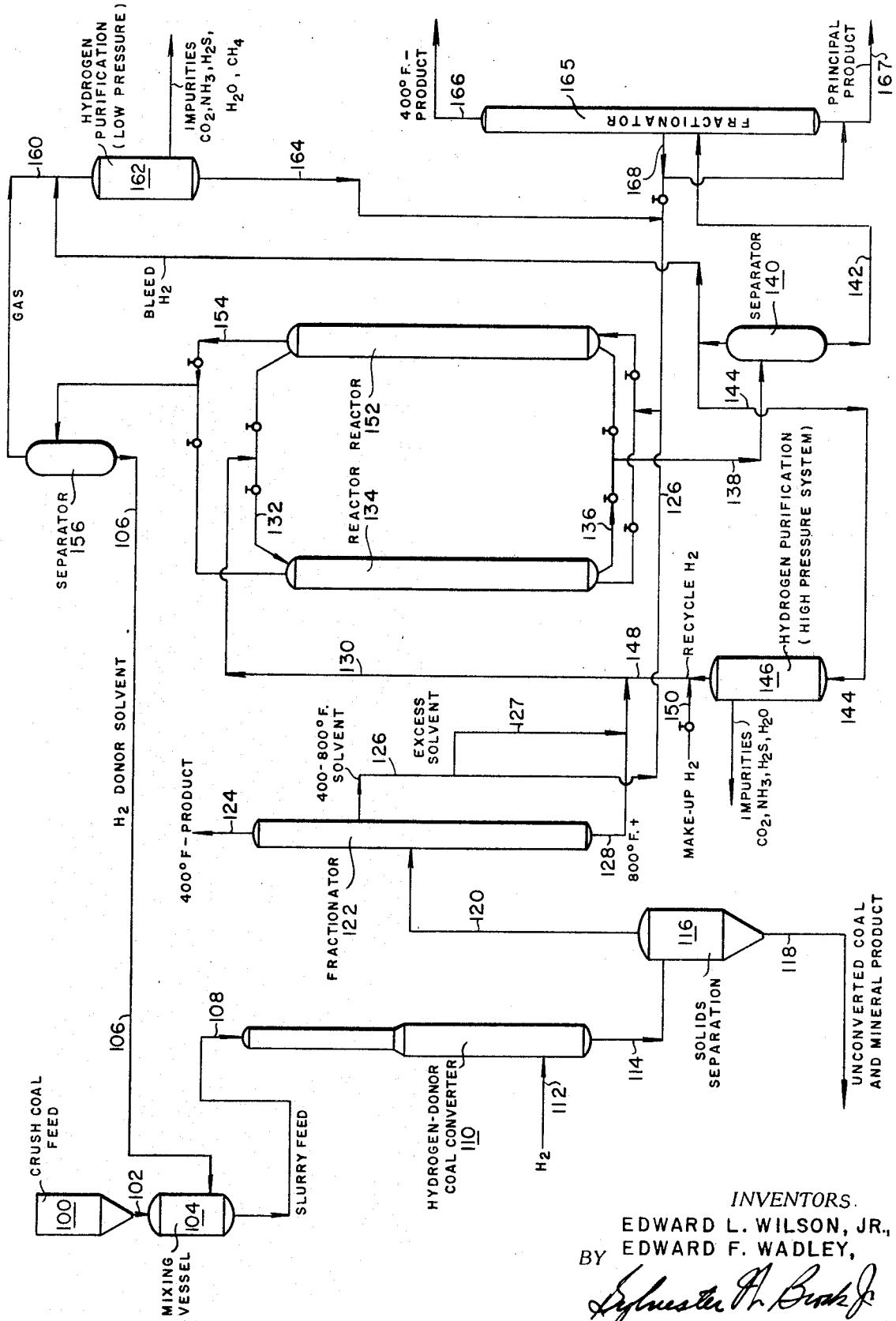

ABSTRACT OF THE DISCLOSURE

In the hydrogen-donor extraction of coal, which results in a hydrogen-depleted donor solvent and a coal extract, the extract is passed over a fixed catalyst bed in a given direction of flow (e.g., downflow) to obtain the benefits of plugflow through the reaction zone. This results in a deactivation of the catalyst and a deposition of impurities upon the surface of the catalyst which causes a substantial increase in pressure drop across the bed. When the catalyst has been substantially deactivated or the pressure drop has substantially increased, the extract feed is terminated and the depleted donor solvent is passed through the reaction zone in the opposite direction of flow (e.g., upflow) under hydrogenation conditions, whereby occluded solids are backwashed and the catalyst particles are cleansed both by removal of the solids and by solution of deposited tarry materials. After a suitable period of time, the catalyst bed has been cleaned so that catalyst activity will be higher and the pressure drop across the bed will be lower than before the donor solvent had been fed across the bed. At this point in time, the donor solvent is cut out of the reactor and extract is reintroduced into the reactor in the given (e.g., downflow) direction of flow. Preferably, a plurality of reactors are used so the streams may be switched sequentially from one reactor to the other, as the beds become deactivated from the hydrogenation of coal extract.

BRIEF SUMMARY OF THE INVENTION

The conversion of coal extracts obtained by hydrogen-donor solvation of coal is preferably carried out in a fixed bed reactor so that the benefits of plugflow through the reactor can be obtained. Although a downflow reactor is preferred for this service (and will be used as exemplary of the present invention), an upflow reactor would also be suitable. However, the pressure drop across a fixed bed reactor of this sort will increase and the activity of the catalyst will decrease with respect to time. Contained in the extract feed to the reactor are minute particles of solid impurities which deposit in the bed. Also the extract feed contains very heavy hydrocarbonaceous type molecules which will deposit on the surface of the catalyst and with time will begin to foul the surface of the catalyst. When the pressure drop and catalyst activity becomes limiting, the bed must be treated so as to increase catalyst activity and reduce pressure drop. By the present invention, this is accomplished by using the deactivated catalyst beds for the hydrogenation of hydrogen-depleted solvent, which (assuming downflow service for extract hydrogenation) is passed through the bed under hydrogenation conditions in an upflow direction at a linear upward velocity sufficient to cause the particles of impurities to be carried with the solvent, thereby removing the deposits from the surface of the catalyst particles and allowing them to be carried from the reactor with the reactor product. Currently, the heavy hydrocarbon deposits are dissolved by the lighter hydrocarbons of the depleted solvent.

After the hydrogenation of solvent has been carried out for a time sufficient to reactivate the catalyst, the solvent feed may be terminated and the reactor may then again be used to hydrogenate extract which is passed through the bed in a downflow direction.

An important advantage of this process is that the catalyst is cleaned and pressure drop across the bed is decreased while the catalyst is being used for a commercial purpose, that is, the hydrogenation of hydrogen-depleted donor solvent. When two or more reactors are used, the solvent may be passed upwardly through the beds of one or more reactors while extract is being passed downwardly through the catalyst bed of one or more other reactors. Thus, a unique cyclic process is presented which will optimize the use of equipment in the hydrogen-donor extraction of coal.

BRIEF DESCRIPTION OF THE DRAWING

The drawing contains a single figure which constitutes a schematic flow diagram of the present invention.

DETAILED DESCRIPTION

The production of coal extract by contacting crushed coal with a hydrogen-donor solvent is well known. Coal of bituminous rank or lower is suitable as a feedstock for contacting with a hydrogen-donor solvent, either in the presence of externally added molecular hydrogen or not, whereby an extract is obtained in solution in the hydrogen-depleted donor solvent.

Suitable hydrogen-donor solvents are well known in the art, such as the aromatic oil obtained by coal extraction which boils from 400 to 800° F., tetrahydronaphthalene (tetralin), 9,10-dihydrophenanthrene, etc. The extraction zone may be operated at a temperature from 650 to 900° F., a pressure from 150 to 1000 p.s.i.g., an external hydrogen feed rate of 0 to 10,000 s.c.f. per ton of MAF coal (MAF meaning moisture and ash-free), a space velocity of 0.25 to 4.0 LHSV, and a solvent-to-coal ratio of 1 to 3 volumes per volume.

The residence time in the extraction zone may range from 0.25 to 4 hours (based on the liquid), and a product is removed from the extraction zone which comprises unreacted coal char, hydrogen-depleted solvent, and coal extract. The products are separated by flashing light carbonaceous materials and by filtering or centrifuging the remaining liquid, to remove the unreacted coal char. The resulting clarified liquid (coal extract) is a low hydrogen content material which must be upgraded by the addition of hydrogen if it is to be of commercial value. The liquid comprises a solution of the extract in hydrogen-depleted solvent.

By the present invention the mixture of hydrogen-depleted solvent and coal extract is fractionated so as to obtain a solvent stream and an extract stream (which may contain some solvent), and at least a portion of the extract stream is passed through a fixed bed catalytic hydrogenation zone, preferably in a downflow direction, in contact with molecular hydrogen and under hydrogenation conditions so as to add hydrogen to the extract, thereby hydrocracking at least a substantial portion of the large molecules in the extract. The conditions in the downflow extract hydrogenation zone may be within the ranges as shown in Table I.

TABLE I.—CONDITIONS for EXTRACT HYDROGENATION

|  | Minimum | Maximum | Preferred |
|---|---|---|---|
| Temperature, ° F | 750 | 950 | 800 |
| Pressure, p.s.i.g | 1,000 | 6,000 | 2,500 |
| Hydrogen feed, s.c.f./b | 600 | 12,000 | 6,000 |
| Space velocity, LHSV | 0.10 | 1.0 | 0.20 |
| Solvent/extract wt. ratio, #/# | 0 | 3 | 1 |

In the fixed-bed downflow reactor, the benefits of plug-flow are obtained so that the extract is operated on as a continually changing product stream, rather than in a completely mixed, homogeneous stream as would be the case in a fluidized bed reactor. However, in fixed bed operations, the bed will ultimately become plugged by the packing of particles at the upstream end of the bed and by deposition of material upon the surface of the catalyst particles. Further, the catalyst particles will be substantially deactivated by such deposition. At this point in time, the coal extract feed into the hydrogenation zone is terminated, and the bed must be rejuvenated.

Rejuvenation of the bed is accomplished by using that same deactivated catalyst for the hydrogenation of hydrogen-depleted solvent from the extraction zone. The hydrogen-depleted solvent is passed through the bed in an upflow direction, in contact with molecular hydrogen, under hydrogenation conditions as set forth in Table II.

TABLE II.—SOLVENT HYDROGENATION CONDITIONS

|  | Minimum | Maximum | Preferred |
| --- | --- | --- | --- |
| Temperature, °F | 700 | 900 | 750 |
| Pressure, p.s.i.g | 400 | 2,000 | 1,500 |
| Hydrogen feed, s.c.f./b | 1,000 | 9,000 | 2,500 |
| Space velocity, LHSV | 0.2 | 2.0 | 1.0 |

The linear upward velocity of the hydrogen-depleted solvent is sufficiently high to cause particles of deposited impurities to be supported by the solvent, thereby unpacking and removing the occluding material. The solvent dissolves deposited tarry materials, reactivating the catalyst. Thus, there is obtained a cleansed catalyst which will provide a bed of reduced pressure drop when the reactor is returned to downflow service.

A number of catalysts are suitable for use in this service such as nickel sulfide, tungsten sulfide, and mixtures thereof, nickel molybdate, cobalt molybdate, and molybdenum on silica-alumina. However, it is preferred to use a 3.5% cobalt, 12.8% molybdenum oxide catalyst supported on an inert body such as alumina, having a particle size diameter of about 1/8 inch. In general, the particle sizes of the catalyst can range from about 1/16 inch to about 1/2 inch.

Referring now to the drawing wherein a preferred mode is set forth, it is seen that a crushed coal feed hopper 100 is provided wherein a coal such as Illinois No. 6 seam, having been crushed to a particle size that will pass through an 8 mesh screen, is passed through line 102 into a mixing vessel 104, where it is contacted with a hydrogen-donor solvent (obtained as hereinafter discussed) which is introduced by way of line 106. The ratio of solvent to coal is about 2 to 1, on a weight basis. The resulting slurry is passed by way of line 108 into a hydrogen-donor coal converter 110, wherein molecular hydrogen may be admitted if desired by way of line 112; preferably, the hydrogen is not admitted. In the hydrogenation zone, preferred conditions will include a temperature of about 750° F., a pressure of about 300 p.s.i.g., a hydrogen feed rate of about 2000 s.c.f. per ton of MAF coal, a space velocity of about 1 LHSV and a solvent-to-coal weight ratio of about 2. The residence time for the coal in the extraction zone is about 1 hour, and the residence time for the solvent in the extraction zone is about 1 hour.

A total product is removed from the extraction zone by way of line 114 and is passed through a solid separation zone 116, which preferably is a centrifuge, and a residue stream 118 comprising unconverted coal char and mineral matter is removed while a liquid stream 120 comprising the hydrogen depleted solvent and coal extract is passed into a fractionator 122. In the fractionator 122 a light product boiling at 400° F. and less is removed overhead by way of line 124. This product comprises about 5% of the total liquids fed into the fractionator. A solvent side stream, boiling within the range of 400 to about 800° F., is withdrawn by way of line 126, and a bottoms stream, the material boiling higher than about 800° F., is withdrawn by way of line 128. The bottom stream, which is heavy coal extract, is passed by lines 128, 130 and 132 into a first reactor 134, in a downflow direction, and is withdrawn from the bottom of the reactor by way of line 136 and line 138 for separation in vessel 140, the liquid being passed by way of line 142 and the gases, including unreacted hydrogen, being passed by way of line 144 through a hydrogen purification system 146, including a compressor, and being recycled by way of line 148 into admixture with the extract feed into the reactor. Makeup hydrogen may be added through the line 150.

Concurrently, the hydrogen-depleted donor oil is passed by way of line 126 and line 150 into a second reactor 152 which had been used in the downflow hydrogenation of coal extract until the bed became deactivated and pressure drop became limiting. The hydrogen-depleted solvent is contacted with hydrogen in the reactor 152 under preferred conditions including a temperature of 750° F., a pressure of 1500 p.s.i.g., a space velocity of 1 LHSV, and a hydrogen feed rate of 2500 s.c.f./b., and is passed from the reactor 152 through line 154 into separator 156, wherein the hydrogen is separated from the liquid products. The hydrogen gas is passed by way of line 160 into a hydrogen purification system 162 and is recycled into contact with the solvent feed by way of line 164. The liquid product, which is a hydrogen-replenished donor solvent is passed from the separator 156 by way of line 106 into the slurrying vessel as hereinabove described.

If excess solvent is produced, it may be passed by way of line 127 into line 128 for treatment with the coal extract.

The ultimate extract product, which is removed from the separator 140 by way of line 142, is passed into a fractionator 165, wherein a low-boiling stream is removed by way of line 166 overhead, a bottoms stream is removed by way of line 167, and a side stream is removed by way of line 168 if desired. Optionally, a portion of the side stream 168 may be passed back into the feed stream to the solvent hydrogenation reactor, if this amount of solvent is needed or if the amount of hydrogenation in the reaction zone 152 is insufficient.

When the bed in reactor 134 becomes deactivated, the reactor services are switched through the unnumbered lines which are shown, so that reactor 134 is used for the upflow hydrogenation of hydrogen-depleted donor oil and the reactor 152 is used for the downflow hydrogenation of coal extract.

As stated hereinabove, the present invention can also be employed in the reverse situation; that is, treating hydrogen-depleted solvent in the downflow service and treating coal extract in the upflow service.

Having disclosed our invention and the details of a preferred mode in carrying it out, what is desired to be protected by Letters Patent should be limited not by the specific examples hereinabove given, but rather by the appended claims.

We claim:
1. In the hydrogen-donor solvent extraction of coal wherein a hydrogen-depleted solvent stream and a coal extract stream are obtained, a process which comprises
    passing at least a portion of the coal extract through a fixed bed catalytic hydrogenation zone in a first vertical direction in contact with molecular hydrogen and a plurality of catalyst particles,
        at a temperature from 750 to 950° F.,
        a pressure from 1000 to 6000 p.s.i.g.,
        a space velocity from 0.2 to 2.0 LHSV, and
        a hydrogen rate from 600 to 12,000 s.c.f./b., until the activity of the catalyst particles has been substantially reduced and the pressure drop across the catalyst bed has substantially increased, whereupon the coal extract feed into the reactor is terminated, and thereafter passing at least a portion of said hydrogen-depleted solvent through said hydrogenation zone in second vertical direction opposite to said first vertical direction and in contact with molecular hydrogen,
- at a temperature from 700 to 900° F.,
- a pressure from 400 to 2000 p.s.i.g.,
- a space velocity from 0.2 to 2.0 LHSV, and
- a hydrogen rate from 10.0 to 9000 s.c.f./b., the linear velocity of said hydrogen-depleted solvent being at least sufficient to carry occluding solids away from the bed, whereby said catalyst particles are cleansed of surface contaminants and are reactivated, and said hydrogen-depleted solvent is hydrogenated, and thereafter terminating the flow of said hydrogen-depleted solvent into said hydrogenation zone and reintroducing a coal extract feed thereinto in said first vertical direction.

2. A process in accordance with claim 1 wherein the catalyst is cobalt molybdate supported on alumina, having a particle size from 1/16 to 1/2 inch.

3. A process in accordance with claim 1 wherein said first vertical direction is downflow and said second vertical direction is upflow.

4. A process for producing hydrocarbon liquids from coal which comprises in an extraction zone, contacting particulate coal with a hydrogen-donor solvent
- at a temperature from 650 to 850° F.,
- a pressure from 200 to 1000 p.s.i.g.,
- a coal residence time from 0.25 to 2 hours, and
- a solvent residence time from 0.25 to 2 hours, removing from the extraction zone a stream comprising unreacted coal char, hydrogen-depleted solvent, and coal extract, separating the unreacted coal char from the hydrogen-depleted solvent and coal extract, separating the hydrogen-depleted solvent from the coal extract, passing at least a portion of the coal extract through a fixed bed catalytic hydrogenation zone in a first vertical direction in contact with molecular hydrogen
- at a temperature from 750 to 950° F.,
- a pressure from 1000 to 6000 p.s.i.g.,
- a space velocity from 0.1 to 1.0 LHSV, and
- a hydrogen rate from 600 to 12,000 s.c.f./b.

until the activity of the catalyst has been substantially reduced and the pressure drop across the bed has substantially increased, whereupon the coal extract feed into the reactor is terminated, and thereafter passing at least a portion of said hydrogen-depleted solvent through said hydrogenation zone in a second vertical direction opposite to said first vertical direction and in contact with molecular hydrogen,
- at a temperature from 700 to 900° F.,
- a pressure from 400 to 2000 p.s.i.g.,
- a space velocity from 0.2 to 2.0 LHSV, and
- a hydrogen rate from 1000 to 9000 s.c.f./b., the linear velocity of said hydrogen-depleted solvent being at least sufficient to carry occluding solids away from the bed but insufficient to carry a substantial quantity of said catalyst particles out of said hydrogenation zone, whereby said catalyst particles are cleansed and reactivated and said hydrogen-depleted solvent is hydrogenated, and thereafter terminating the flow of said hydrogen-depleted solvent into said hydrogenation zone and reintroducing a coal extract feed thereinto in said first vertical direction.

5. A process in accordance with claim 4 wherein the catalyst is cobalt molybdate supported on alumina, having a particle size from 1/16 to 1/2 inch.

6. A process in accordance with claim 5 wherein said first vertical direction is downflow and said second vertical direction is upflow.

7. In the hydrogen-donor solvent extraction of coal wherein a hydrogen-depleted solvent and a coal extract are obtained, the process which comprises passing at least a portion of the coal extract in a first vertical direction through a fixed bed catalytic zone until the activity of the catalyst has been substantially reduced and the pressure drop across the bed has been substantially increased, whereupon the coal extract feed into the reactor is terminated, thereafter passing a portion of said hydrogen-depleted solvent through said hydrogenation zone in a second vertical direction opposite to said first vertical direction and under hydrogenation conditions and at a velocity sufficient to carry occluding solids away from the bed but at an upward velocity insufficient to carry a substantial quantity of said catalyst particles out of the hydrogenation zone, whereby said catalyst particles are cleansed and reactivated, and said hydrogen-depleted solvent is hydrogenated, and thereafter terminating the flow of said hydrogen-depleted solvent into said hydrogenation zone and reintroducing the coal extract feed theretoo in said first direction.

8. A process in accordance with claim 7 wherein the catalyst is cobalt molybdate supported on alumina, the particles sizes being from 1/16 to 1/2 inch.

9. A process in accordance with claim 7 wherein said first vertical direction is downflow and said second vertical direction is upflow.

10. A process for producing hydrocarbon liquids from coal which comprises in an extraction zone, contacting particulate coal with a hydrogen-donor solvent,
- at a temperature of about 750° F.,
- a pressure from about 300 p.s.i.g.,
- a coal residence time of about 1 hour, and
- a solvent residence time of about 1 hour, removing from the extraction zone a stream comprising unreacted coal char, hydrogen-depleted solvent, and coal extract, separating the unreacted coal char from the hydrogen-depleted solvent and coal extract, separating the hydrogen-depleted solvent from the coal extract, passing at least a portion of the coal extract through a fixed bed catalytic hydrogenation zone in a downflow direction in contact with molecular hydrogen,
- at a temperature of about 800° F.,
- a pressure of about 2500 p.s.i.g,
- a space velocity of about 0.2 LHSV, and
- a hydrogen rate of about 6000 s.c.f./b., until the activity of the catalyst has been substantially reduced and the pressure drop across the bed has been substantially increased, whereupon the coal extract feed into the reactor is terminated, and thereafter passing at least a portion of said hydrogen-depleted solvent through said hydrogenation zone in an upflow direction and in contact with molecular hydrogen,
- at a temperature of about 750° F.,
- a pressure of about 1500 p.s.i.g.,
- a space velocity of about 1.0 LHSV, and
- a hydrogen rate of about 2500 s.c.f./b., the linear upward velocity of said hydrogen-depleted solvent being sufficient to carry occluding solids away from the bed but insufficient to carry a sufficient quantity of said catalyst particles out of said hydrogenation zone, whereby said catalyst particles are cleansed and reactivated and said hydrogen-depleted solvent is hydrogenated, and thereafter terminating the flow of said hydrogen-depleted solvent into said hydrogenation zone and reintroducing a coal extract feed thereinto in a downflow direction, the catalyst particles in said hydrogenation zone comprising cobalt molybdate on alumina, having a particle size of about 1/8 inch.

References Cited

UNITED STATES PATENTS

| | | | |
|---|---|---|---|
| 3,232,861 | 2/1966 | Gorin et al. | 208—10 |
| 3,275,546 | 9/1966 | Retallick | 208—10 |

DELBERT E. GANTZ, Primary Examiner

V. O'KEEFE, Assistant Examiner